(12) United States Patent
Sundaram (10) Patent No.: US 6,226,767 B1
(45) Date of Patent: May 1, 2001

(54) DISC MEDIA GLIDE TEST HEAD

(75) Inventor: Ramesh Sundaram, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/203,827

(22) Filed: Dec. 1, 1998

Related U.S. Application Data (60) Provisional application No. 60/067,682, filed on Dec. 5, 1997.

(51) Int. Cl.$^7$ .................................................. G11C 29/00
(52) U.S. Cl. ............................................ 714/723; 73/105
(58) Field of Search ..................... 360/103–104, 360/122; 73/104–105; 714/723; 369/300, 13, 44.19; 356/357

(56) References Cited

U.S. PATENT DOCUMENTS

| | | | |
|---|---|---|---|
| 4,532,802 | * | 8/1985 | Yeack-Scranton et al. ........ 73/866.4 |
| 5,423,111 | * | 6/1995 | Mori .................................... 29/90.01 |
| 5,423,207 | * | 6/1995 | Flechsig et al. ......................... 73/104 |
| 5,450,747 | * | 9/1995 | Flechsig et al. ......................... 73/105 |
| 5,572,386 | * | 11/1996 | Ananth et al. ......................... 360/103 |
| 5,612,839 | * | 3/1997 | Jacques ................................. 360/103 |
| 5,675,462 | * | 10/1997 | Ayabe .................................... 360/135 |
| 5,689,064 | * | 11/1997 | Kennedy et al. ....................... 73/105 |
| 5,805,284 | * | 9/1998 | Lacey .................................... 356/357 |
| 5,817,931 | * | 10/1998 | Boutaghou ............................. 73/105 |
| 5,825,181 | * | 10/1998 | Schaenzer et al. ................... 324/212 |
| 5,864,054 | * | 1/1999 | Smith, Jr. .............................. 73/105 |
| 5,942,680 | * | 8/1999 | Boutaghou ............................. 73/105 |
| 5,956,217 | * | 9/1999 | Xuan et al. ........................... 360/135 |
| 5,963,396 | * | 10/1999 | Burga et al. .......................... 360/103 |
| 6,040,953 | * | 3/2000 | Malone et al. ......................... 360/53 |

OTHER PUBLICATIONS

Galbraith et al.(Magneto–Resistive Head Thermal Asperity Digital Compensation.IEEE, 1992).*
Clark(the Effect of Slider Roughness on Asperity Testing of Thin–Film Media.IEEE, 1993).*
Suzuki et al.(Measurement of Flash Temperature and Contact Between Slider and Magnetic Recording Disk.IEEE, 1989).*
Ito et al.(Influence of Surface Texture of a Thin–Film Rigid Disk on Frictional Properties at the Head–Disk Interface.IEEE, 1990).*

* cited by examiner

*Primary Examiner*—Albert Decady
*Assistant Examiner*—Guy Lamarre
(74) *Attorney, Agent, or Firm*—Raghunath S. Minisandram (57) ABSTRACT

A glide test head which includes a pillar or column member positioned on the lower surface of the laterally-extending wing that mounts the piezo element of the glide test head, and extends toward the disc surface being tested. The preferred location of the column member is near the trailing and outermost edges of the laterally-extending wing. The dimensions of the column member and the flying attitude of the glide test head are selected to make the lowermost surface of the column member the closest contact point of the entire test head during test operation, and to contribute minimal effect on the overall hydrodynamic operation of the glide test head. In a related aspect of the invention, it is envisioned that the test system in which the inventive glide test head is implemented will spin the disc under test at a greater than normal speed, thus increasing the throughput of the test system.

3 Claims, 5 Drawing Sheets

DISC MEDIA GLIDE TEST HEAD

CROSS-REFERENCE TO RELATED APPLICATION

This Application claims the benefit of United States Provisional Application Ser. No.60/067,682, filed Dec.5, 1997.

BACKGROUND OF THE INVENTION

This invention relates generally to the field of disc drive data storage devices or disc drives, and more particularly, but not by way of limitation, to an improved glide test head for testing for the presence of asperities on the surface of magnetic data recording discs.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches, $12\mu$") or greater, the surface characteristics of the discs were adequate for the times.

Disc drives of the current generation incorporate heads that fly at nominal heights of only about $2.0\mu$", and products currently under development will reduce this flying height to $1.5\mu$" or less. Obviously, with nominal flying heights in this range, the surface characteristics of the disc medium must be much more closely controlled than was the case only a short time ago.

In current disc drive manufacturing environments, it is common to subject each disc to component level testing before it is assembled into a disc drive. One type of disc test is referred to as a "glide" test, which is used as a go/no-go test for surface defects or asperities, or excessive surface roughness. A glide test typically employs precision spin stand and a pzt-glide test head. The glide test is performed with the test head flown at approximately half the flying height at which the operational read/write head will fly in the finished disc drive product. For instance, if the disc being glide tested is intended for inclusion in a disc drive in which the operational heads will fly at $2.0\mu$", the glide test will typically be performed with the glide test head flying at $1.0\mu$". If the glide test is completed without contact between the glide test head and any surface defects, then the disc is passed on the assumption that there will be no contact between the operational heads and the discs during normal operation with a nominal head flying height twice that of the glide test head flying height.

A typical glide test head includes a piezoelectric crystal, or piezo element, mounted on a wing that extends laterally from the side of the glide test head. Any contact between the air bearing surfaces of the glide test head and a surface asperity on the disc results in excitation or ringing of the slider body of the glide test head. This excitation of the slider is passed to the piezo element which outputs a small electrical signal on attached wires. The electrical signal is detected by associated electronic circuitry, which commonly is connected as an input to go/no-go programming. Thus, if the air bearing surfaces are contacted at any point by a media surface defect or asperity during the glide test, the disc is scrapped as unusable in the disc drive.

The output from the piezo element of the glide test head is a function, among other parameters, of the location of contact between the glide test head and the disc surface asperity. However, glide test heads of the current generation provide no direct information related to the specific location of the slider/asperity contact location relative to the piezo element.

In monitoring the overall quality of disc media, it would be useful to not only know that contact between a glide test head and a surface asperity has occurred, but also to know the precise location of such contact. With this information, further analysis of the nature of the disc surface asperity can be undertaken, such as a microscopic examination of the asperity location. This type of detailed analysis can be useful for monitoring the quality of disc media from numerous sources, and providing information back to the disc supplier for use in improving his manufacturing and handling processes.

A need clearly exists, therefore, for a glide test head which can more precisely define the location of surface asperities on disc media surfaces.

SUMMARY OF THE INVENTION

The present invention is a glide test head which includes a pillar or column member positioned on the lower surface of the laterally-extending wing that mounts the piezo element of the glide test head, and extends toward the disc surface being tested. The preferred location of the column member is near the trailing and outer edges of the laterally-extending wing. The dimensions of the column member and the flying attitude of the glide test head are selected to make the lowermost surface of the column member the closest contact point of the entire test head during test operation, and to contribute minimal effect on the overall hydrodynamic operation of the glide test head. In a related aspect of the invention, it is envisioned that the test system in which the inventive glide test head is implemented will spin the disc under test at a greater than normal speed, thus increasing the throughput of the test system.

It is an object of the invention to provide a glide test head for detecting the precise location of surface asperities on disc media surfaces.

It is a further object of the invention to provide a glide test head which enables the test time for a given disc to be shortened.

It is a further object of the invention to provide a glide test head which is simple and economical to manufacture.

It is a further object of the invention to provide a glide test head which is easily and economically integrated in common, commercially available disc test systems.

The manner in which the above objects are achieved by the present invention, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
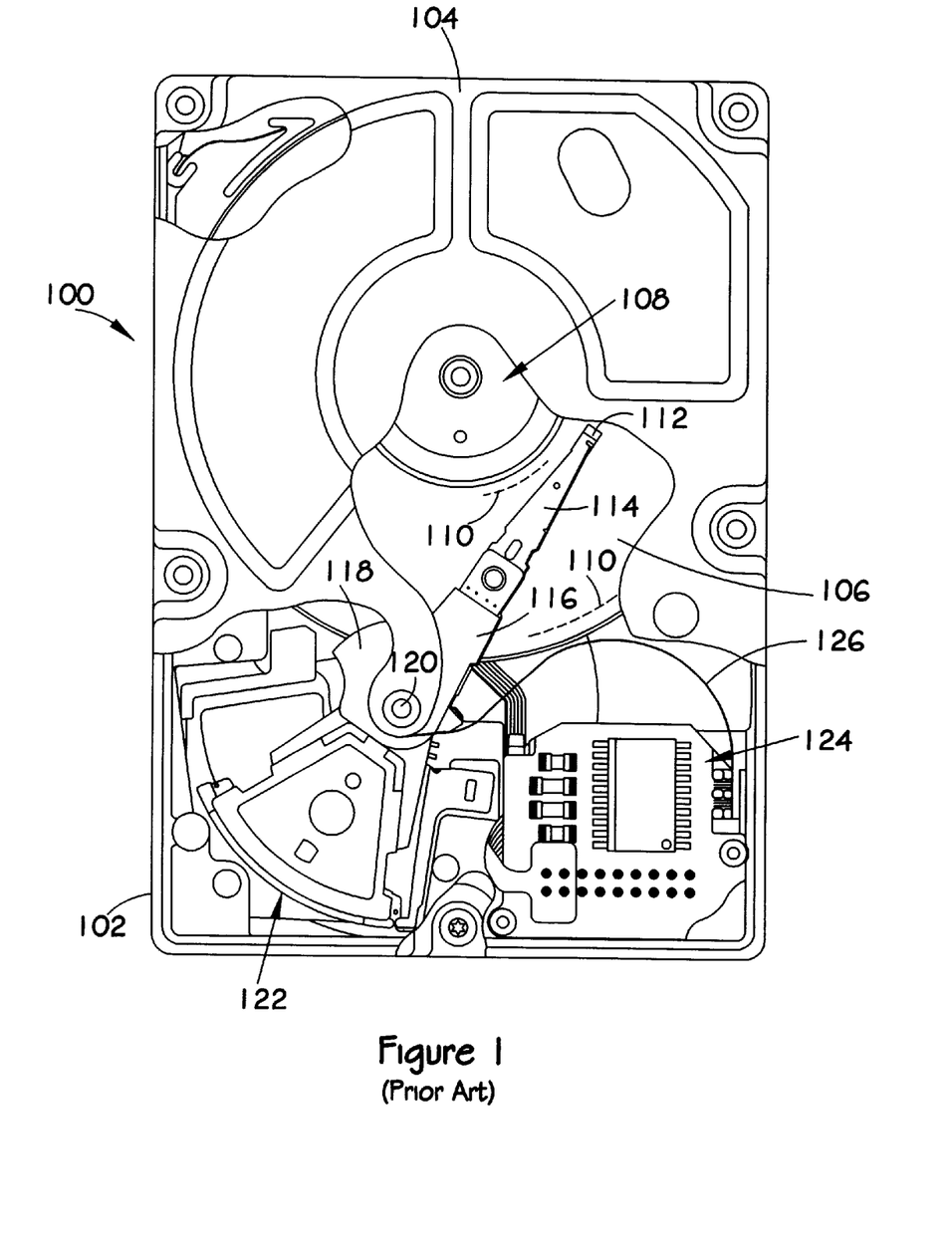
FIG. 1 is a plan view of a disc drive in which discs, which can be tested using the glide test head of the present invention, are utilized.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be apparent to one of skill in the art that the proper operation of the disc drive 100 will depend in large part to the existence of a controlled, precise relationship between the head assemblies 112 and the discs 106. Therefore, it is common in the industry to test each of the discs 106 included in the disc drive 100 before the discs 106 are assembled into a disc drive 100.

Figure 2:
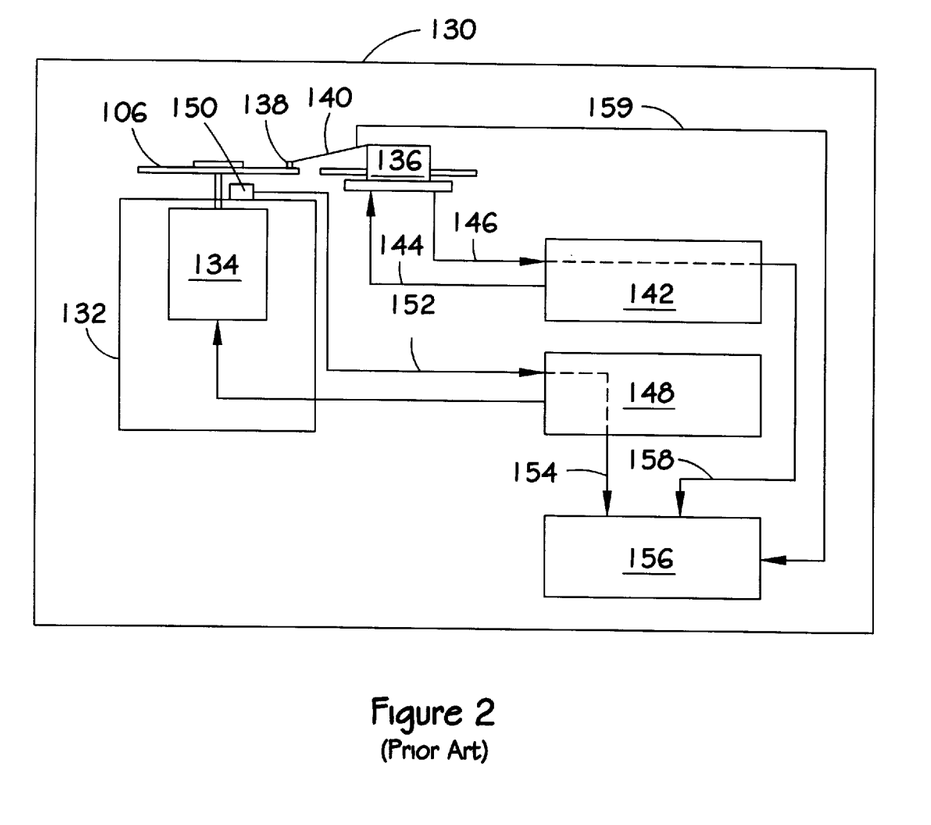
FIG. 2 is a simplified functional block diagram of a prior art test system in which the glide test head of the present invention can be integrated.

FIG. 2 is a simplified functional block diagram of a typical prior art test unit 130 used to test and map the surface of recording discs as components before the discs are assembled into disc drive units. The test unit 130 includes a precision spin stand 132 which further includes a spin motor 134 on which the disc 106 is mounted for rotation and testing.

The test unit 130 also typically includes a linear actuator 136 which is used to controllably move a test head 138, mounted on a head suspension 140, on a linear path across a radius of the disc 106. Actuator control logic 142 is also included in the test unit 130 and provides the control signals on signal path 144 needed to move the test head 138 and monitors, via signal path 146, the position of the test head 138 during testing of the disc 106. In a typical test unit of the current art, the actuator supports and controls a second test head for simultaneous testing of the second disc surface. For purposes of clarity, the figure shows only a single test head 138.

The test unit 130 also includes spin motor control logic 148 which is used to accelerate the spin motor 134 to its intended testing speed. It is common practice in the industry to vary the speed of the spin motor 134 as the test head 138 is moved across the disc radius to provide a constant linear velocity between the test head 138 and the area of the disc being tested. That is, as the test head 138 is moved inward, the speed of the spin motor is increased proportionally to maintain a constant linear velocity, and thus maintain a constant flying height for the test head 138.

The spin stand 132 also includes a spin motor position detection element 150 which provides a "once around" reference signal. This reference signal is carried over signal path 152 to the spin motor control logic 148 where it is used to assist in the control of the speed of the spin motor 134. The reference signal is also passed via signal path 154 to defect mapping logic 156, where it is utilized, along with the actuator position signal passed via signal path 158 by the actuator control logic 142, to maintain a constant calculation of the radial and circumferential portion of the disc 106 that is located under the test head 138.

During the testing operation, a disc 106 is mounted on the spin motor 134 and the spin motor 134 is brought up to operational speed by the spin motor control logic 148. Once the spin motor 134 is at the proper speed, the actuator control logic 142 causes the actuator 136 to move the test head 138 into cooperative arrangement with the surface of the disc 106. The test head 138 is then stepped across the spinning disc 106 at a rate selected to cause the test head 138 to pass over every portion of the disc surface. As the head is stepped across the disc surface, the spin motor control logic 148 varies the spin motor speed to maintain a constant relative linear velocity between the test head 138 and the disc area being tested as noted above.

A defect on the disc surface will cause the test head 138 to generate a defect signal which is passed to the defect mapping logic 156 via signal path 159. Recognition of the defect signal by the defect mapping logic 156 results in the current radial and circumferential location of the test head 138 relative to the disc 106 being recorded. Once the test head 138 has passed over the entire usable radial extent of the disc 106, all detected and recorded defects are correlated to produce a defect map of the entire disc surface.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, California.

Figure 3:
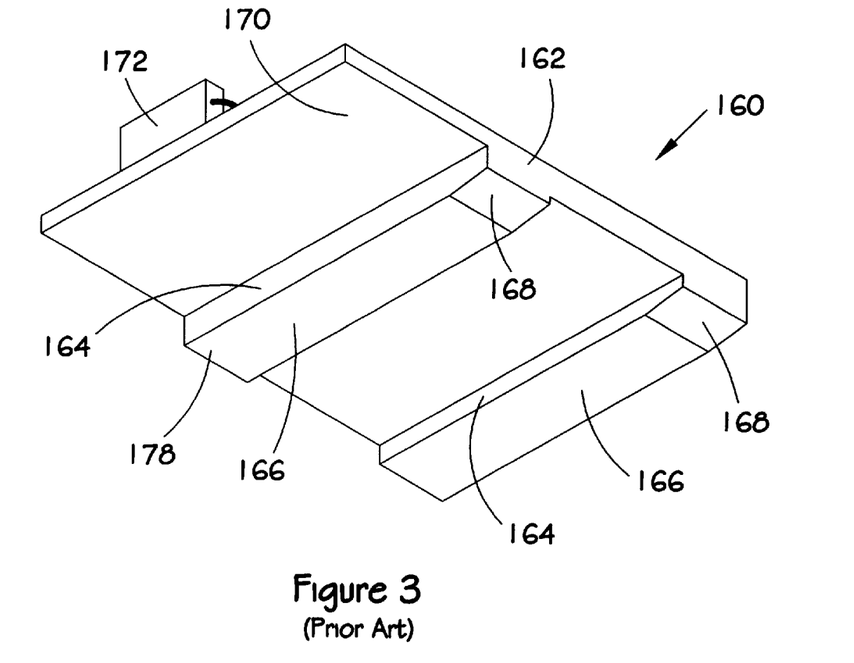
FIG. 3 is a simplified bottom perspective view of a typical prior art glide test head.
Figure 4:
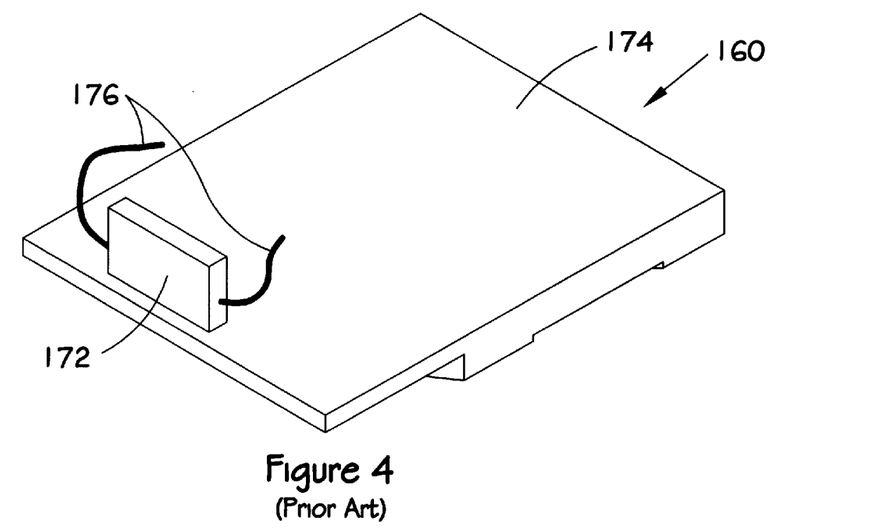
FIG. 4 is a simplified top perspective view of a typical prior art glide test head.

FIGS. 3 and 4 are, respectively, simplified bottom and top perspective views of a typical prior art glide test head 160. The glide test head consists of a slider body 162 which is typically formed from a stable ceramic material, such as aluminum oxide/titanium carbide. Features of the slider body 162 are commonly formed using the processes of machining, ion etching and precision lapping.

The glide test head 160 is of the type sometimes referred to as a "catamaran" slider configuration, since it includes a pair of laterally displaced rails 164. The rails 164 include air bearing surfaces 166, which interact with a thin layer of air dragged along by the spinning disc to fly the glide test head 160 at a desired fly height above the surface of the disc being tested. As is known to those of skill in the art, the flying height is determined, in part, by the geometry of the air bearing surfaces, and the flying attitude of the slider body is a function of the geometry of the air bearing surface, as well as the head suspension (140 in FIG. 2) used to support the glide test head 160.

At the leading edge of the air bearing surfaces 166 the rails 164 also typically include beveled regions 168 which are included to aid in the rapid establishment of the air bearing between the slider body 162 and the spinning disc.

While other forms of slider bodies are known in the art, such as tri-pad sliders and negative pressure air bearing sliders, the scope of the present invention is not envisioned as being limited by the specific form of air bearing elements included in the slider body 162. The catamaran form of FIGS. 3 and 4 has been chosen for illustrative purposes only, due to its familiarity and simplicity.

FIGS. 3 and 4 show that the slider body 162 also includes a laterally extending wing 170 which is used to mount a piezoelectric crystal, or piezo element 172. The reason that the slider body 162 must include the wing 170 for mounting the piezo element 172 is that that portion (shown at 174, generally, in FIG. 4) of the slider body 162 above the rails 164 is used to attach the head suspension (140 in FIG. 2) used to support the glide test head 160.

The piezo element 172 can be seen in the figures to include attached signal wires 176. During operation, such as in a test system similar to that of FIG. 2, any contact between the air bearing surfaces 166 and a surface asperity on the disc under test will result in oscillation or ringing of the entire slider body 162. This excitation of the slider body 162 is conveyed to the piezo element 172 which responds to this excitation by outputting electrical signals on the signal wires 176. These electrical signals are passed to appropriate detection logic (such as the defect mapping logic 156 of FIG. 2). If, as noted in the discussion of FIG. 2 above, the occurrence of the output of the piezo element 172 is correlated to the position of the actuator and the rotational position of the disc under the glide test head, a defect map of the disc under test can be generated. However, due to the nature of the prior art glide test head of FIGS. 3 and 4, the resolution of such a defect map is severely limited. That is, the only information reflected by such a defect map is that a defect on the disc surface contacted some point on one or the other air bearing surfaces 166, and thus the true location of the disc surface asperity is not very precisely known.

Before moving on to a discussion of the glide test head of the present invention, it is worthwhile to discuss further other aspects of the test environment to which the prior art glide test head of FIGS. 3 and 4 pertains.

As previously mentioned, it is common practice in the industry to fly the glide test head at a flying height which is approximately one-half of the flying height of the operational heads in the completed disc drive. That is, if the operational heads in the completed disc drive are intended to fly, for example, at $2.0\mu"$, the nominal flying height of the glide test head during glide testing will be approximately $1.0\mu"$. The actual flying attitude of the glide test head, however, is typically not perfectly in parallel with the surface of the disc. In the pitch axis of the slider, for instance, it is common for the glide test head to fly in a slightly "nose-up" attitude, while in the roll axis of the glide test head, a slight roll attitude is maintained. What this means, in terms of the overall flying attitude of the glide test head, is that the point on the prior art glide test head 160 closest to the surface of the disc being tested is typically that portion of the rail 166 designated with numerical reference 178, and it is this point of the glide test head 160 which flies at the nominal test flying height, or, in the case noted above, at $1.0\,\mu"$.

One of skill in the art will also appreciate that the actual flying height of the glide test head 160 is also a function of the linear velocity maintained between the glide test head 160 and the disc under test, and, as also previously mentioned above, the test system (130 in FIG. 2) strives to maintain a constant linear velocity, and thus a constant flying height for the glide test head 160, by varying the rotational speed of the disc with the radial position of the glide test head 160 relative to the disc.

One aspect of the present invention, which will be discussed in more detail below, allows the glide test head of the present invention to operate at a higher linear velocity than the prior art glide test head of FIGS. 3 and 4. This capability will, in turn, shorten the test time for glide testing each disc, leading to overall savings in production time and/or capital equipment investment.

Figure 5:
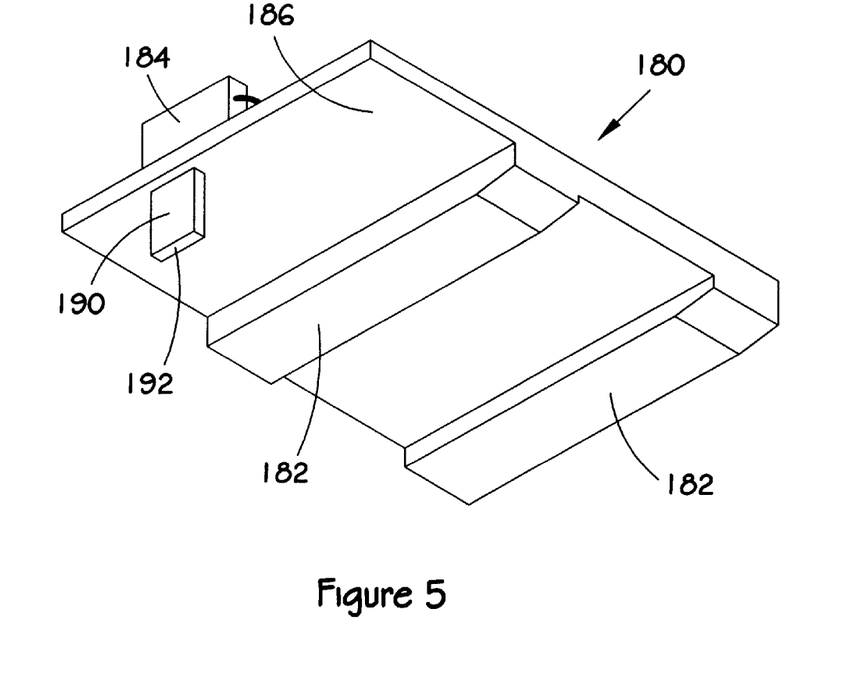
FIG. 5 is a simplified bottom perspective view of a glide test head made in accordance with the present invention.
Figure 6:
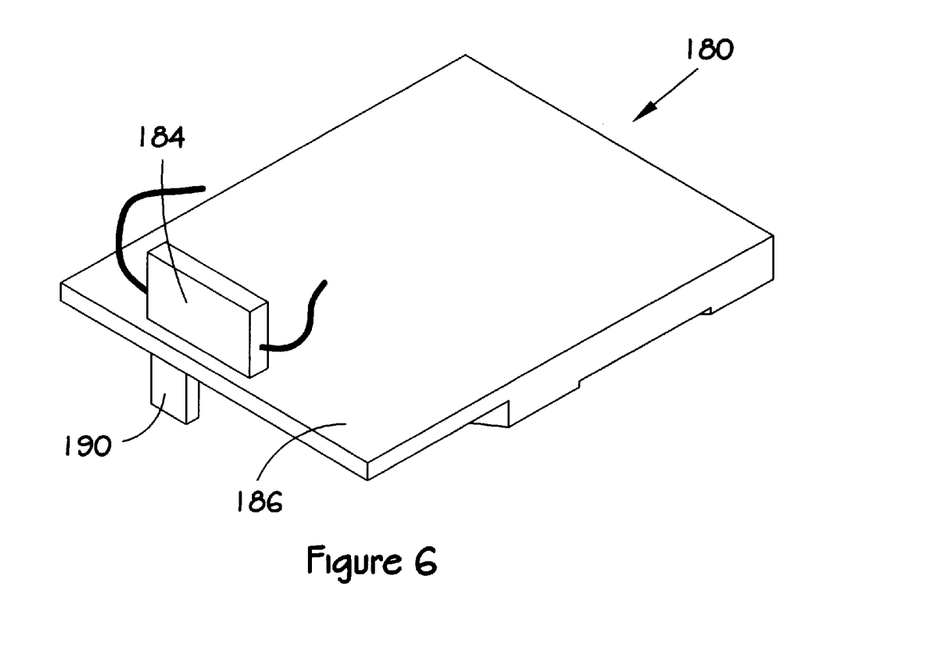
FIG. 6 is a simplified top perspective view of a glide test head made in conjunction with the present invention.

FIGS. 5 and 6 are, respectively, simplified bottom and top perspective views of a glide test head 180 made in accordance with the present invention. As is apparent from an examination of FIGS. 5 and 6, the inventive glide test head 80 has many elements in common with the prior art glide test head 160 of FIGS. 3 and 4. That is, the inventive glide test head 180 includes air bearing surfaces 182, and a piezo element 184 mounted on a laterally extending wing 186.

The difference in the inventive glide test head 180 is the presence of a column member 190 integral to the laterally extending wing 186. As the figures show, the column member 190 is located on the lower side of the laterally extending wing 186, and is positioned opposite the piezo element 184. The length of the column member 190 is selected such that the lowermost surface 192 of the column member 190 is coplanar with or extends below the air bearing surfaces 182. If the column member 190 is formed with its lowermost surface 192 coplanar with the air bearing surfaces, then the flying attitude of the glide test head 180 is established to ensure that the lowermost surface 192 of the column member 190 is the lowermost extreme of the entire glide test head assembly 180. This means that the lowermost surface 192 of the column member 190 will be the part of the entire glide test head 180 in closest proximity to the surface of a disc being tested with the inventive glide test head 180. This relationship is most evident in the simplified side elevation view of FIG. 7, and the simplified end elevation view of FIG. 8.

Figure 7:
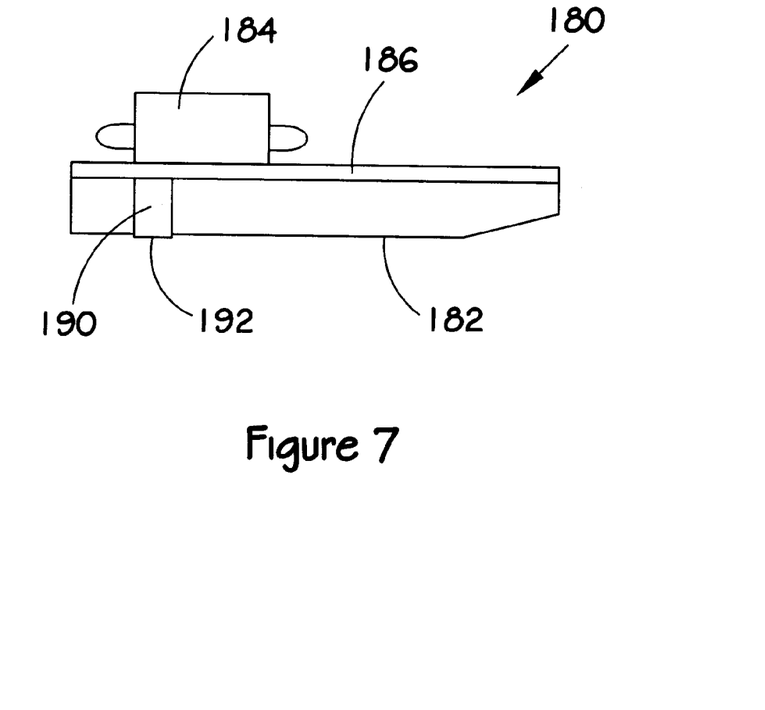
FIG. 7 is a simplified side elevation view of a glide test head made in accordance with the present invention.
Figure 8:
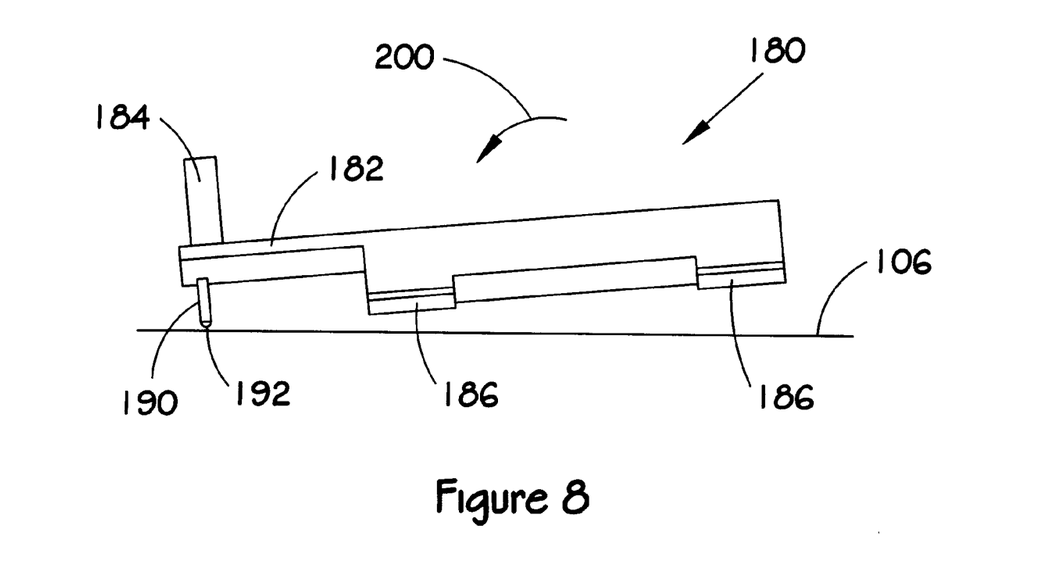
FIG. 8 is an end elevation view illustrating the effect of flying attitude on operation of the glide test head of the present invention.

FIG. 7 shows clearly that the lowermost surface 192 of the column member 190 extends beyond the air bearing surfaces 182 of the glide test head 180 of the present invention, while FIG. 8 shows a second embodiment of the invention in which the lowermost surface of the column member is coplanar with the air bearing surfaces, and the flying attitude is used to bring the lowermost surface of the column member into proximity with the surface of the disc being tested. This geometric arrangement and relative dimensions shown in FIGS. 5 through 8 have several operational consequences:

1) the air bearing surfaces 182 can be flown at a higher fly height than usual for a glide test head, since the lowermost surface 192 of the column member 190 will be the sole contact point between the glide test head 180 and asperities on the surface of a disc being tested;

2) since the glide test head 180 can be flown at a greater flying height, with all other system elements being unchanged, a higher linear velocity between the glide test head 180 and the disc will achieve the greater flying height, while simultaneously decreasing the test time for each disc;

3) since, as is evident in the figures, the area of the lowermost surface 192 of the column member 190 is much smaller than the overall area of the entire air bearing surfaces 182, the resolution of the test system is greatly enhanced (i.e., the location of a disc asperity can be localized to the area of contact between the column member 190 and the disc, rather than between the entire air bearing surfaces 182 and the disc); and 4) since the glide test head of the present invention can be utilized at a higher linear velocity than can a prior art glide test head, any contact between the column member and an asperity on the disc surface will result in a higher impact energy, leading to more vigorous excitation of the slider and an increased amplitude of the output of the piezo element, improving the signal-to-noise ratio and also contributing to the sensitivity of the overall test system.

As is also evident in FIGS. 5, 6,7 and 8, the overall size of the column member 190 is miniscule in comparison to the hydrodynamic functional area of the air bearing surfaces 182, and consequently the inclusion of the column member 190 on the inventive glide test head 180 will have minimal effect on the overall flying characteristics of the glide test head 180.

If, for instance, the functional case described above is used as an example, the inventive glide test head 180 can be flown with the lowermost surface 192 of the column member 190 just $1.0\mu"$ above the disc surface. This, in turn, means that the actual vertical difference between the lowermost surface 192 of the column member 190 and the air bearing surfaces 182 can be selected to determine the flying height of the air bearing surfaces 182. As an example, if the column member 190 extends $1.0\mu"$ below the air bearing surfaces 182, the linear velocity at which the glide test head 180 operates can be increased to fly the glide test head 180 with the air bearing surfaces 182 nominally $2.0\mu"$ above the disc surface. Such an arrangement would allow detection of disc surface asperities of the same size as would be detected by the prior art glide test head 160 of FIGS. 3 and 4. However, since only the lowermost surface 192 of the column member 190 would be within $1.0\mu"$ of the disc surface, the precision with which the location of the disc surface asperity can be determined is greatly increased.

Alternatively, if the lowermost surface 192 of the column member 190 is coplanar with the air bearing surfaces, as shown in the embodiment of FIG. 8, then the relative flying heights of the lower surface 192 of the column member 190 and the air bearing surfaces can be controlled by proper manipulation of the flying attitude of the glide test head.

Turning now to FIG. 8, shown is a simplified front end elevation view of the inventive glide test head 180 in relationship to the surface of a disc 106, as they would be in their operational condition. The glide test head 180 of FIG. 8 is formed with the lowermost surface 192 of the column member 190 coplanar with the air bearing surfaces 186.

FIG. 8 shows that the glide test head 180 is flying with a selected roll attitude, i.e., at an angle along the direction of arrow 200, and has a "nose-up" pitch attitude, reflected by the fact that the air bearing surfaces 186, as well as the under side of the wing 182, are visible in this elevation view. The roll and pitch angles in FIG. 8 are greatly exaggerated over actual roll and pitch angles for illustrative purposes only.

In the figure, it is apparent that, since the column member 190 is laterally displaced from the air bearing surfaces to a great extent, that a relatively minor roll angle will result in a significant difference in the vertical spacing, measured normal to the surface of the disc 106, between the lowermost surface 192 of the column member 190 and the air bearing surfaces. Furthermore, since it is envisioned by the present invention that the column member 190 will be located in close proximity to the trailing edge of the 20 laterally-extending wing 182, the pitch angle will also serve to bring the lowermost surface 192 of the column member 190 into proximity with the disc 106. Thus, the geometry of the glide test head, coupled with its flying attitude, ensures that the lowermost surface 192 of the column member 190 will be the closest element of the glide test head 180 to the disc 106.

In summary, since the inventive glide test head 180 can be used at a greater linear velocity than can the prior art glide test head 160, and since only the lowermost surface 192 of the column member 190 will contact disc surface asperities, the inventive glide test head of the present invention allows faster and more precise mapping of disc surface asperities than would be possible with the prior art glide test head 160 of FIGS. 3 and 4.

From the foregoing, it is apparent that the present invention is particularly well suited and well adapted to achieve the objects set forth hereinabove, as well as possessing other advantages and benefits inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A glide test head for detecting surface asperities on surfaces of disc media comprising:

a slider body, including an arrangement of air bearing surfaces intended to fly the glide test head at a first height above the surface of the disc being tested, the slider body further including a laterally-extending wing;

a column member, integral to and extending from the laterally-extending wing at a location laterally displaced from the air bearing surfaces, the column member extending toward the disc being tested and dimensioned to have a lowermost surface which is disposed at a second height above the disc when the glide test head is in operational engagement with a disc being tested, the second height being less that the first height; and a piezo element mounted on the laterally extending wing at a position opposite the column member, the piezo element being responsive to any contact between the lowermost surface of the column member and asperities on the disc surface, and including signal output means for outputting a surface defect detection signal indicative of such contact between the lowermost surface of the column member and asperities on the surfaces of the discs.

2. A test system for detecting and mapping glide defects in the surface of a magnetic recording disc comprising:

a spin motor for supporting and rotating the disc;

means for generating a disc position signal reflective of the angular position of the disc;

a glide test head comprising:

a slider body, including an arrangement of air bearing surfaces intended to fly the glide test head at a first height above the surface of the disc being tested, the slider body further including a laterally-extending wing;

a column member, integral to and extending from the laterally-extending wing at a location laterally displaced from the air bearing surfaces, the column member extending toward the disc being tested and dimensioned to have a lowermost surface which is disposed at a second height above the disc when the glide test head is in operational engagement with a disc being tested, the second height being less that the first height; and a piezo element mounted on the laterally extending wing at a position opposite the column member, the piezo element being responsive to any contact between the lowermost surface of the column member and asperities on the disc surface, and including signal output means for outputting a surface defect detection signal indicative of such contact between the lowermost surface of the column member and asperities on the surfaces of the discs;

an actuator assembly for moving said glide test head radially across said disc;

means for generating an actuator position signal reflective of the radial position of said glide test head relative to the disc; and defect mapping logic, responsive to said disc position signal, said actuator position signal, and said surface defect detection signal, for mapping the location of detected defects on the surface of the disc.

3. A glide test head, for detecting surface asperities on surfaces of discs being tested, comprising:

a slider body, including an arrangement of air bearing surfaces intended to fly the glide test head above the surfaces of the discs being tested, the slider body further including a laterally-extending wing, and; means associated with the laterally-extending wing for precisely determining the location of the surface asperities on the surfaces of the discs.

* * * * *